US009410097B2

(12) United States Patent
Leininger

(10) Patent No.: US 9,410,097 B2
(45) Date of Patent: Aug. 9, 2016

(54) METHODS AND SYSTEMS OF PRODUCING A PARTICULATE FREE, COOLED SYNGAS PRODUCT

(71) Applicant: General Electric Company, Schenectady, NY (US)

(72) Inventor: Thomas Frederick Leininger, Chino Hills, CA (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 13/833,179

(22) Filed: Mar. 15, 2013

(65) Prior Publication Data
US 2014/0259924 A1 Sep. 18, 2014

(51) Int. Cl.
*C10J 3/84* (2006.01)
*C10K 1/02* (2006.01)
*B01D 45/08* (2006.01)
*C10J 3/48* (2006.01)

(52) U.S. Cl.
CPC . *C10K 1/022* (2013.01); *C10J 3/84* (2013.01); *C10K 1/02* (2013.01); *B01D 45/08* (2013.01); *C10J 3/485* (2013.01); *C10J 2300/093* (2013.01); *C10J 2300/0959* (2013.01); *C10J 2300/0976* (2013.01); *C10J 2300/1603* (2013.01); *C10J 2300/1653* (2013.01); *C10J 2300/1675* (2013.01); *C10J 2300/1678* (2013.01); *Y02E 20/18* (2013.01)

(58) Field of Classification Search
CPC .............. C10K 1/002; C10J 2300/0959; C10J 2300/0976
See application file for complete search history.

(56) References Cited

U.S. PATENT DOCUMENTS

| 4,247,302 | A | 1/1981 | Woldy et al. |
|---|---|---|---|
| 4,248,604 | A | 2/1981 | Woldy et al. |
| 4,251,228 | A | 2/1981 | Muenger et al. |
| 4,326,856 | A | 4/1982 | Muenger et al. |
| 4,584,180 | A | 4/1986 | Ostrov |
| 4,769,157 | A * | 9/1988 | Bassler .................. C02F 11/10 210/758 |
| 4,859,213 | A | 8/1989 | Segerstrom |
| 7,090,707 | B1 | 8/2006 | Barot |
| 7,347,051 | B2 | 3/2008 | Christensen et al. |
| 2006/0260192 | A1 | 11/2006 | Barot |
| 2011/0162376 | A1 * | 7/2011 | Guo ........................ C10J 3/506 60/746 |

OTHER PUBLICATIONS

Kim, M. C., et al., "Design Modification of Virtual Impactor for Enhancing Particle Concentration Performance," Aerosol Science and Technology, Mar. 3, 2000, pp. 233-242, Taylor and Francis.
PCT Search Report & Written Opinion issued May 19, 2014 in connection with corresponding PCT Patent Application No. PCT/US2014/018554.

* cited by examiner

*Primary Examiner* — Matthew Merkling
(74) *Attorney, Agent, or Firm* — Armstrong Teasdale LLP

(57) ABSTRACT

Methods and systems for gasifier system are provided. The system includes a two-stage particulate separator having a side draw-off connector configured as a first virtual impactor, the first virtual impactor configured to separate a substantially particulate free flow of a reaction product from a particulate laden flow of the reaction product. The two-stage particulate separator also includes a transfer line coupled downstream of said draw-off connector, a second virtual impactor coupled downstream of the transfer line, and a quench chamber coupled downstream from the second virtual impactor, such that the quench chamber is configured to receive at least the particulate laden flow of the reaction product.

15 Claims, 7 Drawing Sheets

METHODS AND SYSTEMS OF PRODUCING A PARTICULATE FREE, COOLED SYNGAS PRODUCT

BACKGROUND OF THE INVENTION

This invention relates generally to integrated gasification combined-cycle (IGCC) power generation systems, and more specifically to methods and apparatus for reducing the quantity of solids carried over from the gasifiers into the high temperature syngas coolers that may be employed in IGCC systems where ash-containing fuels are fed to the gasifiers.

At least some known gasification systems include a reaction chamber that forces any particles in the product syngas (unconverted fuel, soot and/or ash in the form of molten slag) to exit the reactor along with all of the gas. Entrainment of all the particles in the product syngas, particularly in the case where a syngas cooler is used immediately downstream of the reactor to cool the gas and particles, results in much more difficult design requirements for the syngas cooler. The syngas cooler must be designed to minimize solids deposition on the heat exchange surfaces so that the cooler can operate with minimal risk of becoming plugged with solids. Such syngas cooler designs require substantial space, both vertically and radially, to enable them to adequately cool both the syngas and the entrained particles. Known syngas cooler designs, which may be oriented in a vertical down-flow configuration below the gasifier, have typically provided a large diameter open channel disposed about the long flow axis of the cooler to allow the passage of solids through the cooler along the centerline without contacting the peripheral heat exchange surfaces. Such syngas cooler designs are large, expensive to manufacture and require expensive support structures.

BRIEF DESCRIPTION OF THE INVENTION

In one implementation, a two-stage particulate separator for use in a gasifier system is provided. The two-stage particulate separator includes a side draw-off connector configured as a first virtual impactor, the first virtual impactor configured to separate a substantially particulate free flow of a reaction product from a particulate laden flow of the reaction product. The two-stage particulate separator also includes a transfer line coupled downstream of the draw-off connector, a second virtual impactor coupled downstream of the transfer line, and a quench chamber coupled downstream from the second virtual impactor, such that the quench chamber is configured to receive at least the particulate laden flow of the reaction product.

In another implementation, a gasifier system is provided. The gasifier system includes a reactor comprising a reaction chamber and a two-stage particulate separator coupled to the reactor. The two-stage particulate separator includes a side draw-off connector configured as a first virtual impactor, the first virtual impactor configured to separate a substantially particulate free flow of a reaction product from a particulate laden flow of the reaction product, a transfer line coupled downstream of the side draw-off connector, and a second virtual impactor coupled downstream of the transfer line. The gasifier system also includes a syngas cooler coupled downstream from the two-stage particulate separator.

In yet another implementation, a method of reacting a fuel in a gasifier and producing a cooled reaction product substantially free of particulates is provided. The method includes partially oxidizing a fuel in the gasifier system to create a reaction product that includes particulate components and gaseous components, removing the particulate components from the gaseous components of the reaction product by passing at least a portion of the reaction product through a two-stage particulate separator comprising a coarse particulate separating first virtual impactor and a fine particulate separating second virtual impactor to produce a substantially particle free flow of reaction product, channeling the flow of the reaction product to a syngas cooler, and cooling the reaction product.

DETAILED DESCRIPTION OF THE INVENTION

Figure 1:
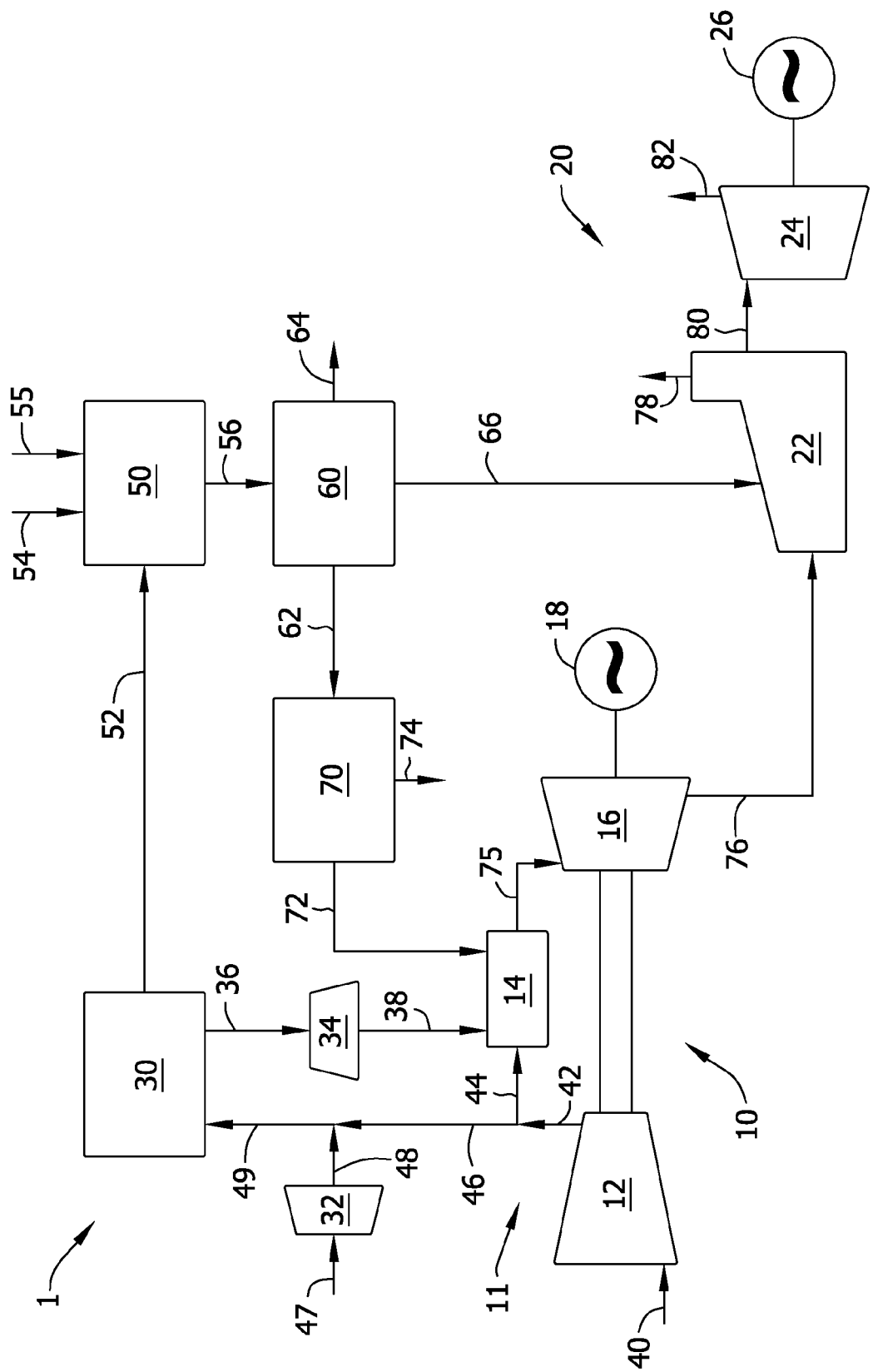
FIG. 1 is a schematic diagram of an exemplary integrated gasification combined-cycle (IGCC) power generation system.

FIG. 1 is a schematic diagram of an exemplary integrated gasification combined-cycle (IGCC) power generation system 1. In an exemplary implementation, IGCC system 1 generally includes a main air compressor 32, an air separation unit 30 coupled in flow communication to compressor 32, a gasifier 50 coupled in flow communication to air separation unit 30, a gas turbine engine 10, coupled in flow communication to gasifier 50, a syngas cooler 60, a syngas cleanup system 70, a heat recovery steam generator 22 and a steam turbine 24. In operation, compressor 32 compresses ambient air 47. The compressed air 48 is channeled to air separation unit 30. In some implementations, in addition to or in the alternative to compressor 32, compressed air 42, 46 from a gas turbine engine compressor 12 is supplied to air separation unit 30. Air separation unit 30 uses the compressed air 49 to generate oxygen 52 for use by gasifier 50. More specifically, in an exemplary implementation, air separation unit 30 separates the compressed air into separate flows of oxygen 52 and a gas by-product 36, sometimes referred to as a "process gas". The process gas 36 generated by air separation unit 30 includes nitrogen and will be referred to herein as "nitrogen process gas". The nitrogen process gas 36 may also include other gases such as, but not limited to, oxygen and/or argon. For example, in some implementations, the nitrogen process gas includes between about 95% and about 100% nitrogen.

The oxygen flow 52 is channeled to gasifier 50 for use in generating raw product gases 56, referred to herein as "raw syngas", which are subsequently cleaned and ultimately used by gas turbine engine 10 as fuel, as described below in more detail. In some known IGCC systems 1, at least some of the nitrogen process gas flow 36, a by-product of air separation unit 30, is vented to the atmosphere. Moreover, in some known IGCC systems 1, some of the nitrogen process gas flow 36, 38 is injected into a combustion zone (not shown) defined within gas turbine engine combustor 14 to facilitate controlling emissions of engine 10, and more specifically to facilitate reducing the combustion temperature and to facilitate reducing nitrous oxide emissions from engine 10. In an exemplary implementation, IGCC system 1 also includes a compressor 34 for use in compressing the nitrogen process gas flow 36 before the flow 38 is injected into the combustion zone.

Gasifier 50 converts a mixture of fuel 54, oxygen supplied by air separation unit 30 and steam 55 or water 55 into hot, raw syngas 56 that is cooled, cleaned and then channeled for use by gas turbine engine 10 as fuel 72. In some implementations, water may be incorporated as part of the fuel 54, such as in the case of coal-water slurry. Although gasifier 50 may use any fuel, in some known IGCC systems 1, gasifier 50 uses coal, petroleum coke, residual oil, oil emulsions, tar sands, and/or other similar fuels. In one implementation, coal or petroleum coke and steam or water may be fed to gasifier 50 as separate streams 54 and 55, respectively. Alternatively, water may be combined with finely ground coal or petroleum coke and fed to gasifier 50 as a combined fuel stream 54 in the form of a coal-water slurry or a petroleum coke-water slurry. In some known IGCC systems 1, hot raw syngas 56 is passed through syngas cooler 60, which may be disposed below gasifier 50 and configured to accept hot, solids-laden raw syngas 56 from gasifier 50 and to produce cooled, relatively solids-free syngas 62 that is channeled to syngas cleanup system 70 for further cleaning. In one implementation, syngas cooler 60 transfers the energy recovered from cooling syngas 62 into boiler feed water to produce a stream of high pressure saturated steam 66 that is channeled to heat recovery steam generator 22 for superheating before being sent as superheated steam 80 to steam turbine 24 for use in producing electrical power.

In one implementation, syngas cooler 60 is configured with a disengaging zone (not shown) at the exit of cooler 60 to separate a cooled stream of particulates 64 from the cooled, relatively solids-free stream of syngas 62. In an exemplary implementation, cooled and relatively solids-free syngas 62 produced by syngas cooler 60 is cleaned in a syngas clean-up system 70 before being channeled to gas turbine engine combustor 14 for combustion as clean fuel gas 72. In syngas cleanup system 70, syngas contaminants such as mercury, sulfur-containing compounds (e.g. H2S and COS), nitrogen-containing compounds (e.g. NH3, HCN) and halide-containing compounds (e.g. HCl) may be removed from the syngas and rejected as one or more byproduct streams 74. Furthermore, syngas cleanup system 70 is also configured to remove any fine particulates remaining in cooled syngas 62 exiting syngas cooler 62. In an implementation, carbon dioxide may also be separated from syngas 62 during the clean-up process and, in some known IGCC systems 1, may be vented to the atmosphere. Alternatively, the carbon dioxide may be captured as byproduct stream 74 and channeled to an end-user such as an enhanced oil recovery (EOR) field operator for use in augmenting oil production from older oil fields.

In an exemplary implementation, gas turbine engine compressor 12 receives a flow of ambient air 40 and compresses air 40 to produce a flow of compressed air 42, a portion of which may be channeled to air separation unit 30 for use in generating oxygen for use in gasifier 50. The remainder 44 of compressed air flow 42 is channeled to combustor 14 of gas turbine engine 10 where the air is used to combust the clean fuel gas 72 to produce a flow of hot, high pressure combustor exhaust gas 75. Combustor exhaust gas 75 is then expanded through power turbine 16 to produce a flow of low pressure power turbine exhaust gas 76. The power output from the expansion of the gas through power turbine 16 of gas turbine engine 10 drives air compressor 12 and a generator 18 that supplies electrical power to a power grid (not shown). Moreover, in an exemplary implementation, low pressure power turbine exhaust gas 76 is channeled to a heat recovery steam generator 22 where the exhaust gas is cooled and the recovered heat is used to generate superheated steam 80 for driving steam turbine 24 and cooled exhaust gas 78 is vented to the atmosphere. Power generated by steam turbine 24 drives an electrical generator 26 that provides additional electrical power to the power grid. In some known IGCC systems 1, a portion (not shown) of the superheated steam from heat recovery steam generator 22 is supplied to gasifier 50 for generating the syngas.

Figure 2:
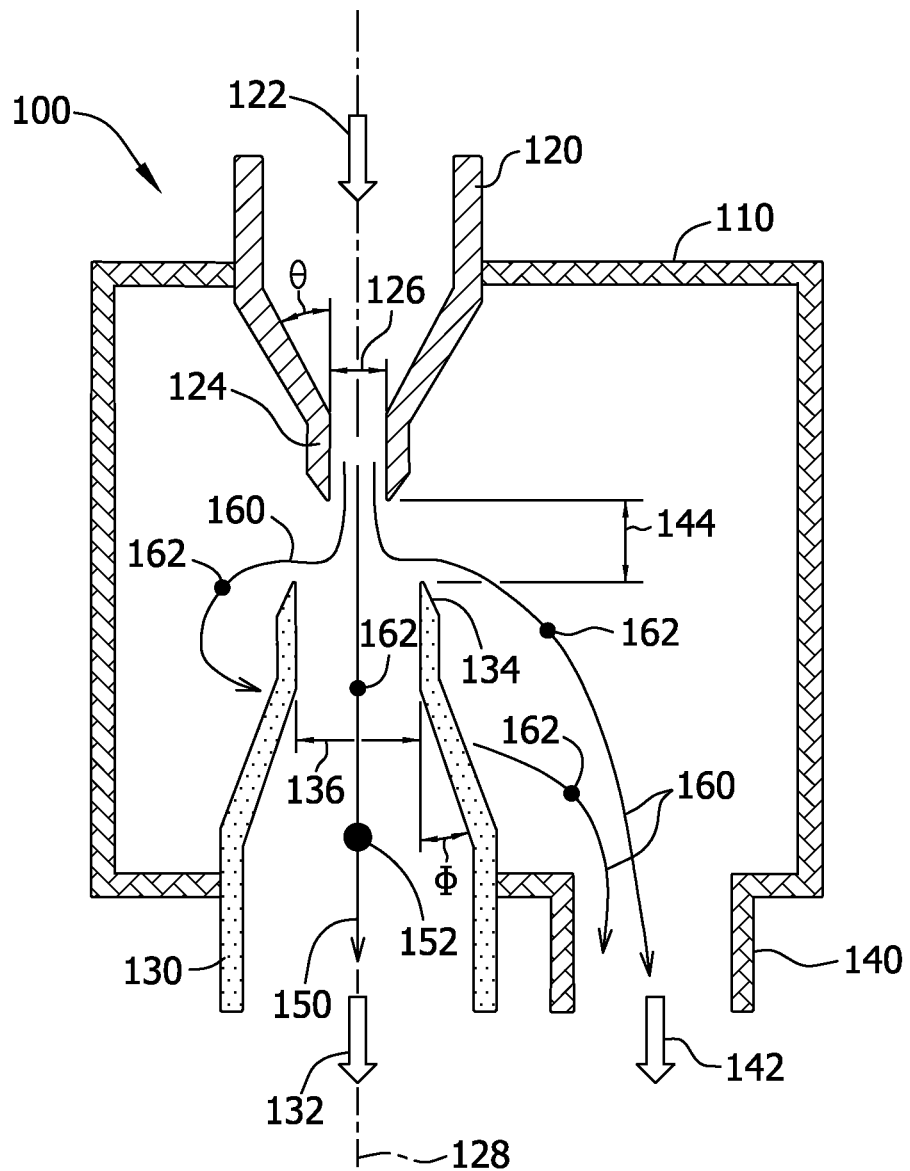
FIG. 2 is a schematic side view of an exemplary virtual impactor that may be incorporated into a two-stage particulate separator for use with the IGCC power generation system shown in FIG. 1.

FIG. 2 is a schematic side view of an exemplary virtual impactor 100. In an exemplary implementation, virtual impactor 100 is configured to separate an inlet flow of particulate solids laden gas 122 into a first flow of gas 132 that has substantially all of the particulate solids concentrated within it and a second flow of gas 142 that is substantially free of particulate solids. Inlet flow 122 is also known as a total flow 122, first flow 132 is also known as a minor flow 132, and second flow 142 is also known as a major flow 142. In one implementation, the ratio of major flow rate to the minor flow rate is on the order of 10:1, however, the ratio be any ratio that facilitates producing particulate free syngas as described herein. In an exemplary implementation, the flow rates of the minor and major flows are controlled by equipment (flow meters, control valves, etc.) located downstream of virtual impactor 100 and not shown.

In one implementation, virtual impactor 100 includes an inlet channel 120 for conducting total flow 122 into virtual impactor 100, a first outlet channel 130 for conducting minor flow 132 out of virtual impactor 100, a second outlet channel 140 for conducting major flow 142 out of virtual impactor 100 and a body 110 which forms an extension of second outlet channel 140 and which defines an enclosed space around inlet channel 120 and first outlet channel 130. In some implementations, inlet channel 120 and first outlet channel 130 have a circular cross-section, however, inlet channel 120 and first outlet channel 130 may have any cross-sectional shape including, but not limited to a square and a rectangular. In one implementation, the cross-sections of inlet channel 120 and first outlet channel 130 are geometrically similar, i.e. circular with circular or rectangular with rectangular and share a common axial centerline 128. Incorporated within inlet channel 120 is a flow acceleration nozzle 124 characterized by converging angle θ and orifice diameter 126 that accelerates both gas and particulate solids comprising total flow 122 in the direction of centerline 128 of first outlet channel 130. Incorporated within outlet channel 130 is a receiving nozzle 134 characterized by diverging angle ϕ and orifice diameter 136. In one implementation, flow acceleration nozzle 124 and receiving nozzle 134 are separated by nozzle separation distance 144.

During operation, as total flow 122 is accelerated through acceleration nozzle 124, the gaseous component of total flow 122 partitions in a manner that is governed by the control equipment located downstream of both first outlet channel 130 and second outlet channel 140. As total flow 122 moves from flow acceleration nozzle 124 to first outlet channel 130, the direction of flow of the gas which partitions to minor flow 132 deviates very little from the straight downward direction.

Thus, the streamlines that describe minor flow 132 are generally straight and downwards in direction, as shown by streamline 150. In contrast, as total flow 122 moves from flow acceleration nozzle 124 to second outlet channel 140, the direction of flow of the gas which partitions to major flow 142 deviates significantly from the straight downward direction. As shown by streamlines 160, major flow 142 first moves straight downwards, then at right angles to the original flow direction, and then downwards again to second outlet channel 140.

In contrast to the gaseous component of total flow 122, which partitions according to the settings of the downstream flow control equipment, the particulate solids contained within total flow 122 partition according to their ability to follow the streamlines of the gaseous flow component. Smaller or less dense particles are able to change direction rapidly so that they can follow bent streamlines such as major flow streamlines 160. In contrast, larger or denser particles are unable to change direction rapidly, so they tend to continue moving along their original trajectory. This contrast is illustrated in FIG. 2 where the smaller or less dense particulate solids 162 are shown following both the straight streamlines 150 of the minor flow 132 and the bent streamlines 160 of the major flow 142, whereas the larger or denser particulate solids 152 are shown following only the straight streamlines 150 of the minor flow 132, continuing along their original trajectories. As a consequence of the larger, denser particulate solids being able to follow only the straighter streamlines that align with the original trajectory of total flow 122, the vast majority of the larger or denser particulate solids in the total flow tend to partition with the minor flow 132 along with a substantial fraction of the smaller or less dense particulate solids. Thus, minor flow 132 is significantly enriched in particulate solids and major flow 142 is significantly depleted in particulate solids. In some implementations, depending on the particle size distribution of the particulate solids in the incoming total flow 122 as well as on the ratio of major to minor flow rates, the separation can be so effective that the major flow 142 will be substantially free of particulate solids.

FIG. 3 is an alternative virtual impactor 200. Virtual impactor 200 is configured to provide improved ability to separate an incoming total flow into a minor flow that is enriched in particulate solids and a major flow that is depleted in solids. As with virtual impactor 100 shown in FIG. 2, virtual impactor 200 includes an inlet channel 120 for total flow 122, a first outlet channel 130 for minor flow 132, a second outlet channel 140 for major flow 142, and body 110 that extends outlet channel 140 upwards and defines an enclosed space around inlet channel 120 and first outlet channel 130. Inlet channel 120 incorporates a flow acceleration nozzle 124 characterized by angle θ and internal diameter 126. First outlet channel 130 incorporates a receiving nozzle 134 characterized by angle ϕ and internal diameter 136.

Virtual impactor 200 also includes a flow guide 236 that is added to the tip of receiving nozzle 134. Flow guide 236 curves outwards and upwards from the tip of the receiving nozzle 134 and reduces a nozzle separation distance 244 to a very low value. In some implementations, nozzle separation distance 244 is zero (as shown in FIG. 3) or a negative number. Flow guide 236 is configured to force streamlines 260 of major flow 142 to bend more severely than streamlines 160 of major flow 142 shown in FIG. 2. As shown in FIG. 3, the deviation from an original trajectory that is imposed upon streamlines 260 of major flow 142 forces any particles 162 remaining in major flow 142 to make a more severe deviation in flow direction in order to continue all the way to second outlet 140. The bending of streamlines 260 forces more of the smaller or less dense particles to remain with minor flow 132 rather than major flow 142 because a larger fraction of the smaller or less dense particles 162 will be unable to make the deviation from their original trajectory. Thus, an enhanced level of particle concentration in minor flow 132 is provided by the use of a flow guide in the design of virtual impactor 200.

In an exemplary implementation, the ratio of the inner diameter of receiving nozzle 136 to the inner diameter of flow acceleration nozzle 126 ranges from 1.2 to 1.5. The ratio of nozzle separation distance 144 to the inner diameter of flow acceleration nozzle 126 ranges from 1.2 to 1.8. It should be noted that the ratio of the inner diameter of receiving nozzle 136 to the inner diameter of flow acceleration nozzle 126 and nozzle separation distance 144 to the inner diameter of flow acceleration nozzle 126 can be any value that that facilitates producing particulate free syngas as described herein. Flow accelerating nozzle convergence angle θ ranges from 40° to 50°. Virtual impactor 200 is designed to leave particulate solids in the major flow with diameters no larger than a few microns or, in some cases, much less.

It should be noted that industrial size virtual impactors can benefit the design of large heat exchangers in high solids content service through their ability to produce a major flow stream that is nearly or substantially free of particulate solids. FIGS. 4 through 7 illustrate how two large virtual impactors in series can be used for their combined ability to remove particulate solids from a large flow of process gas in order to simplify the design of syngas coolers that otherwise would have to be designed to operate in high solids content service.

FIG. 4 is a schematic side view of an exemplary gasification system 300 that may be used with the integrated gasification combined-cycle (IGCC) power generation system 1 (shown in FIG. 1). In an exemplary implementation, gasification system 300 includes a high pressure, high temperature, entrained-flow gasifier or quench gasifier 302, a two-stage solids separator 304 and a fire tube syngas cooler 306. Gasifier 302 generates a hot, solids-containing raw syngas and two-stage solids separator 304 removes the solids from the syngas so that fire tube syngas cooler 306 can cool the gas without becoming plugged by the solids. Gasifier 302 includes a reactor 308, a bottom cone/exit throat 310, a plenum chamber 312, and a quench chamber 314. Reactor 308 is a substantially cylindrically shaped, vertical steel pressure vessel 316 lined with high temperature ceramic refractory material 318 that defines a substantially cylindrically shaped enclosed space known as a reaction chamber 320.

A feed injector 322 is coupled to the top of reactor 308, such that feed injector 322 conducts the reactor feeds into reactor 308 via separate internal channels (not shown) and then simultaneously mixes and sprays the feeds into reaction chamber 320. The feeds react to form the reaction chamber product, known as raw syngas, which contains both gaseous and particulate components. Below reactor 308 is bottom cone/exit throat 310, which is an extension of the refractory-lined steel pressure vessel of reactor 308. Bottom cone/exit throat 310 defines the bottom of reaction chamber 320, limits the radiative heat loss from hot reaction chamber 320 to cold quench chamber 314, and accelerates the flow rate of the raw product syngas out of reaction chamber 320 via the cylindrically shaped exit throat nozzle.

In one implementation, below bottom cone/exit throat 310 is cylindrically shaped plenum chamber 312, which is a further extension of the refractory-lined steel pressure vessel of reactor 308. The diameter of plenum chamber 312 is larger than the diameter of the exit throat nozzle of bottom cone/exit throat 310 in order to match the diameter of the inlet to quench chamber 314. Quench chamber 314 is a substantially cylindrically shaped, vertical steel pressure vessel with a cone-shaped bottom and connections for an inlet flow of clean quench water 324, an outlet blow down flow of dirty quench water 326, an outlet flow of quenched syngas 328, and an outlet flow of quenched solids 330. In one implementation, quench chamber 314 is separated from the refractory-lined portions of the gasifier above it by a refractory support floor 332 constructed from steel, however, any high temperature alloy could be used in support floor 332. In some implementations, refractory support floor 332 is a flat, circular disk with a circular hole that matches the internal diameters of plenum chamber 312 and the inlet to quench chamber 314.

Figure 4:
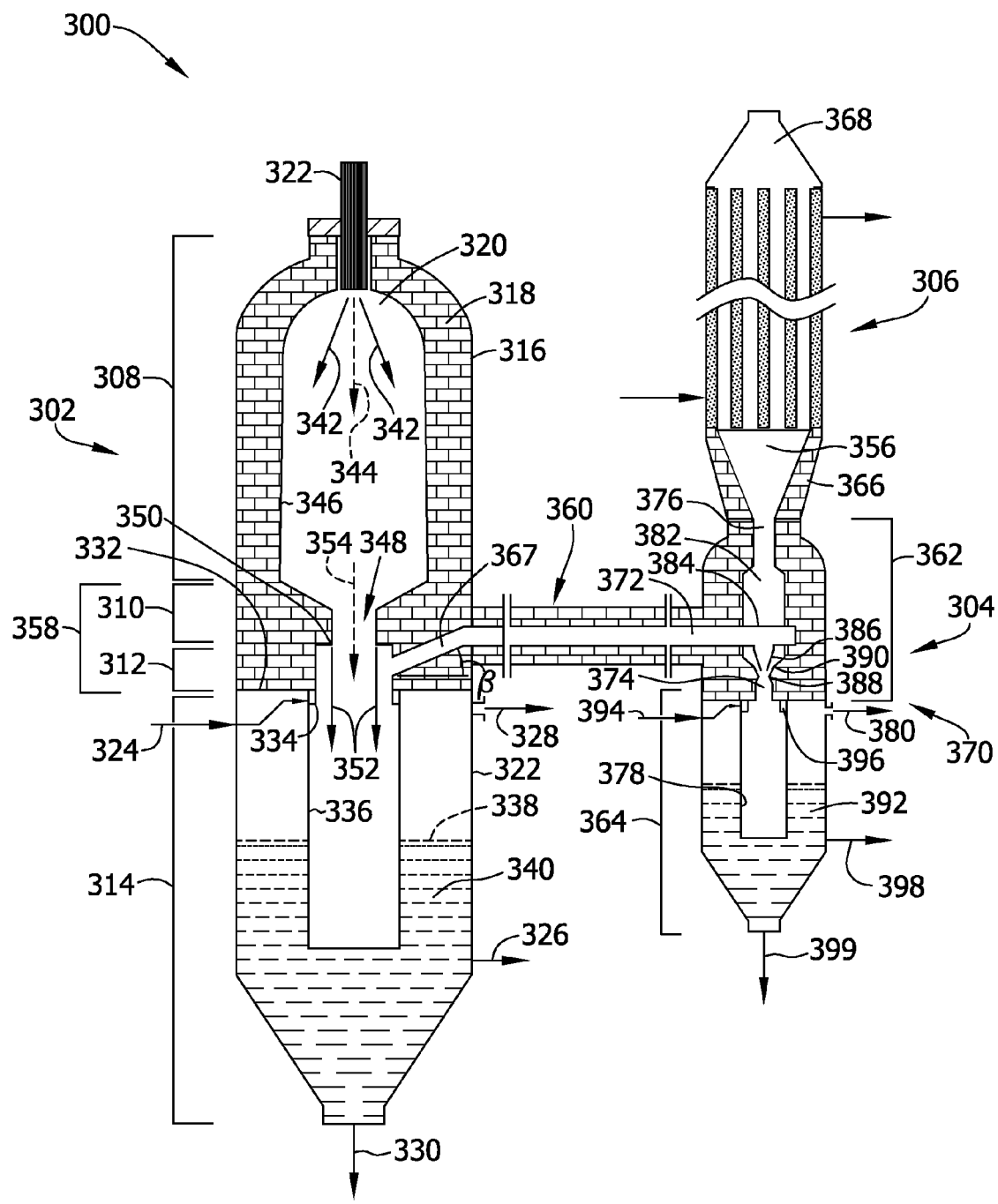
FIG. 4 is schematic side view of an exemplary gasification system that may be used in the IGCC power generation system shown in FIG. 1.

In an exemplary implementation, a quench ring 334 and a dip tube 336 is affixed to the bottom surface of refractory support floor 332 and coaxially aligned with the centerline of reaction chamber 320, bottom cone/exit throat 310, and the plenum chamber 312. Dip tube 336 extends downwards into quench chamber 314 to a point which is below a surface 338 of a pool of water 340 that is maintained within quench chamber 314 by controlling the inlet flow of clean quench water 324 and the outlet flow of dirty quench blow down water 326. The top of dip tube 336 and quench ring 334 comprise the inlet to quench chamber 314. Clean quench water 324 that enters quench ring 334 is distributed by ring 334 upon the interior surface of dip tube 336 such that a continuous falling film of water covers the entire interior surface of dip tube 336. The water in the falling film that reaches the bottom edge of dip tube 336 joins with pool of water 340 contained within the bottom portion of quench chamber 314. As explained above, the level, or top surface 338 of pool of water 340 is maintained by withdrawing dirty quench blow down water 326 from pool 340 at a rate that is sufficient to maintain the level. When not operating, the water level inside dip tube 336 is substantially the same as water level 338 in the rest of quench chamber 314. However, during normal gasifier operation, the flow of raw product syngas is sufficient to push the water level inside dip tube 336 down to the bottom edge of dip tube 336, as shown in FIG. 4. In operation, the raw product syngas exits dip tube 336, bubbles through the pool of quench water 340, and exits quench chamber 314 as quenched syngas 328.

During operation of quench gasifier 302, feed injector 322 injects, or sprays, feeds into reaction chamber 320, such that the feeds rapidly mix, react, and generate syngas from reaction chamber 320. In the course of injecting the feed material into the gasifier, feed injector 322 imparts an initial momentum to the feeds, as indicated by solid arrows 342 and dashed arrow 344, which together depict the expanding spray pattern that is typical of many conventional feed injectors used with high pressure, entrained flow gasifiers. The majority of the reacting material, depicted by solid arrows 342, tends to follow a trajectory oriented towards the wall 346 of reaction chamber 320. A small fraction of the injected material, depicted by dashed arrow 344, has an initial trajectory that carries it straight down towards exit 348 of reaction chamber 320.

As fuel particles, e.g. coal particles, move through reaction chamber 320, the organic components rapidly react to form syngas, whereas the inorganic components (ash, mineral matter) form fine droplets of molten ash (or slag) that have the ability to coalesce with other droplets and as well as to deposit on surfaces such as reaction chamber wall 346. The molten ash particles that follow the trajectory depicted by solid arrows 342 eventually intersect wall 346 of reaction chamber 320 and accumulate to form a layer of molten ash (or molten slag) that runs down the wall and exits the reaction chamber through bottom cone/exit throat 310. As shown in FIG. 4, the interface between the smaller diameter of the exit throat and the larger diameter of plenum chamber 312 creates an edge 350 from which droplets of molten ash separate from the refractory wall and drop downwards, as shown by arrows 352. The sizes of the droplets depend upon the ash composition and the gasifier operating temperature, but can range anywhere from a fraction of a millimeter to over a centimeter in diameter, with occasional larger particles possible. The fine molten ash droplets that follow the trajectory depicted by dashed arrow 344 rarely contact reaction chamber wall 346, although some coalesce with other droplets to form larger droplets. This collection of fine and coalesced molten ash droplets generally has sizes that range from a fraction of a millimeter down to a few micrometers, or smaller. The molten ash eventually exits reaction chamber 320 without contacting any surfaces, as shown by dashed arrow 354.

Under some gasifier operating conditions, not all of the organic components of fuel may be converted to syngas. In such cases, unconverted carbonaceous material tends to form very fine solid carbonaceous particulates that can follow either a path towards wall 342 or a path straight down towards reaction chamber exit 344. The unconverted solid carbonaceous particles that follow the path towards wall 342 may intersect wall 346 and be captured by the layer of molten ash on wall 346, becoming incorporated into the material running down the wall towards edge 350 from which they separate from the refractory wall, as shown by arrows 352. The unconverted solid carbonaceous particles that follow the direct path towards exit 344 may exit reaction chamber 320 as shown by dashed arrow 354 without contacting any surfaces or other particles and in other cases may contact a molten ash droplet, becoming incorporated into that droplet. As shown in FIG. 4, both molten ash droplets, as well as solid carbonaceous particles, can follow either the wall path, as depicted by solid arrows 342 and 352, or the direct path, as depicted by dashed arrows 344 and 354. Molten ash layer 346 and any incorporated solid carbonaceous particulates leaving reaction chamber 320 via the pathway depicted by solid arrow 352 plus the fine, solid carbonaceous particulates and molten ash droplets (including any incorporated solid carbonaceous particulates) leaving reaction chamber 320 via the pathway depicted by dashed arrow 354 can together be referred to as syngas particulates or, simply, particulates. It is these particulates which must be removed from the syngas in order to provide particle free syngas for further processing downstream and, in particular, for operating syngas coolers with minimal risk of plugging by particulates.

In a conventional quench gasifier 300, separation of the particulates from syngas exiting reaction chamber 320 occurs in the quench chamber 314. Together, the syngas and particulates, those following path 352 as well as those following path 354, pass downwards through dip tube 336 and into pool of water 340 in quench chamber 314. In the pool of quench water 340, the particulates (molten ash droplets and solid carbonaceous particles) disengage from the raw syngas, which bubbles through the quench water and leaves quench chamber 314 as cooled and quenched (water-saturated) syngas 328. The disengaged particles cool and, in the case of the molten ash, solidify to become solid ash particles. The coarser, denser solid particles settle to the bottom of quench chamber 314 and leave the quench chamber via bottom exit 330. From there, solid particles are depressured and dewatered in a solids handling system (not shown). The finer, less dense solid particles remain in the quench water and exit the quench chamber 314 via dirty quench water blow down connection 326. The quench gasifier 300 configuration enables thermal energy contained in hot syngas exiting reaction chamber 320 to be recovered as steam (water of saturation) via the direct contact heat exchange between the hot syngas and the cold water that takes place in quench chamber 314.

However, in some implementations, it may be desirable to recover thermal energy contained in syngas by cooling the syngas indirectly in a syngas cooler. This may be done because a cooled syngas product is required that does not contain high levels of water, or because the high pressure steam that can be generated in a syngas cooler is needed for another application elsewhere in a plant. Examples may include use of the steam for electrical power generation in a steam turbine generator or for mechanical power generation in a compressor with a steam turbine drive. In some implementations, when it is desired to recover thermal energy in hot syngas without directly quenching the hot syngas in water, quench chamber 314 is replaced by a down flow syngas cooler (not shown). Syngas coolers employed in this service must not only cool hot syngas from temperatures on the order of 2300° to 2600° F. to temperatures on the order of 900° to 1400° F., but they must also contend with the presence in the syngas of hot and often relatively sticky particulates.

In one implementation, syngas coolers are constructed with a large open channel down the centerline of the cooler, which aligns with the common centerline of reactor 308, bottom cone/exit throat 310 and plenum chamber 312 above it. Heat exchange surfaces consisting of a plurality of tubes through which boiler feed water may circulate are disposed about the periphery of this large central channel to cool the hot syngas by the combined mechanisms of radiant and convective heat transfer. Because radiant heat transfer is a significant means of heat transfer in such coolers, they are often referred to as radiant syngas coolers. The large open channel down the centerline of the syngas cooler reduces the chances of particulate deposition on the heat exchange surfaces that may lead to plugging of the syngas cooler by providing a flow path for the hot particulates that, for the most part, avoids direct impingement of particulates on the heat exchange surfaces. It should be appreciated that providing a large open channel in the centerline of such a syngas cooler significantly increases the diameter of the cooler and deployment of large peripheral heat exchange surfaces made of multiple boiler tubes requires a much larger space than would be required if the syngas were able to be cooled using alternate means, such as a fire tube syngas cooler. Additionally, because the radiant syngas cooler must cool both gas and particulates, it must be longer (i.e. more heat exchange surface area) than if the syngas cooler were just required to cool particulate free syngas. With all of these factors taken together, it should be appreciated that the requirement to handle hot particulates along with syngas results in a syngas cooler that is significantly larger, both in radius and overall length, compared with a syngas cooler for particulate free syngas.

However, as shown in FIG. 4, it is possible to configure a system that separates hot particulates from raw syngas before the syngas is passed through a syngas cooler. The prior removal of the particulates greatly simplifies the syngas cooler design and allows a smaller, less expensive fire tube syngas cooler to be used in place of the larger and more expensive radiant syngas cooler. The impact of substituting a fire tube syngas cooler for a radiant syngas cooler goes well beyond the savings in space and cost associated with the smaller fire tube syngas cooler. Additional savings also result from the ability to use a shorter, lighter duty gasifier support structure and shorter piping and instrument conduit runs. Furthermore, the reliability of a fire tube syngas cooler operating on substantially particulate free syngas is expected to be noticeably improved compared with the reliability of a radiant syngas cooler operating in sticky particulate containing syngas service.

As shown in FIG. 4, fire tube syngas cooler 306 cools syngas from entrained flow gasifier 302 by inserting virtual impactor 304 between outlet 348 of gasifier reaction chamber 320 and inlet 356 of fire tube syngas cooler 306. In an exemplary implementation, a first virtual impactor 358 includes bottom cone/exit throat 310 of gasifier 302, plenum chamber 312, dip tube 336 and a hot side draw-off channel 367. The syngas product from reaction chamber 320 is equivalent to total flow 122 shown in FIG. 2, the syngas which passes straight down into dip tube 336 is equivalent to minor flow 132, and the syngas that passes into hot side draw-off channel 367 is equivalent to major flow 142. As with FIG. 2, the valves and instrumentation that control the flow rates of the minor flow into dip tube 336 and the major flow into hot side draw-off channel 367 are not shown. In the case of FIG. 4, the control equipment for the minor flow is located downstream of quenched syngas exit 328 and the control equipment for the major flow is located downstream of exit 368 of fire tube syngas cooler 306. Bottom cone/exit throat 310 functions as flow acceleration nozzle 124 in FIGS. 2 and 3. In one implementation, bottom cone/exit throat 310 accelerates the inlet, or total, gas flow produced in reaction chamber 320, along with all the entrained particulates, towards dip tube 336. Dip tube 336 functions both as receiving nozzle 134 and outlet channel 130 in FIGS. 2 and 3, and conducts the minor flow of product syngas along with entrained coarse and fine particles into first quench chamber 314.

Figure 3:
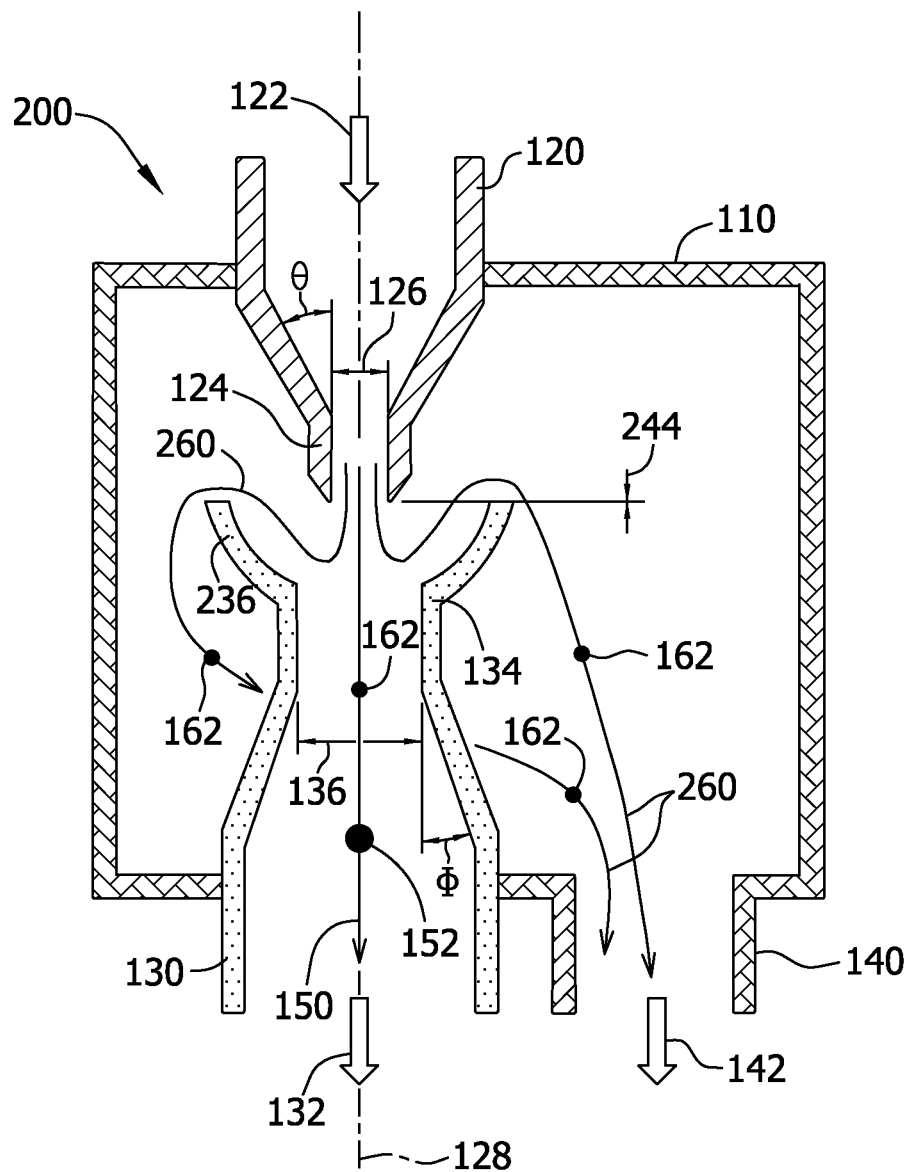
FIG. 3 is a schematic side view of an alternative exemplary virtual impactor that may be incorporated into a two-stage particulate separator for use with the IGCC power generation system shown in FIG. 1.

In one implementation, hot side draw-off channel 367, which is oriented at an angle β from the horizontal plane defined by refractory support floor 332, functions both as flow guide 236 and as outlet channel 140 shown in FIG. 3. Upward angle β of hot side draw-off channel 367 is configured to bend the streamlines of the major flow of syngas entering the hot side draw-off channel 367 by 90+β degrees from the vertical axis of gasifier 302. As shown in FIGS. 2 and 3, coarser particles are unable to negotiate the sharp changes in direction imposed on the major gas flow by the geometry of the virtual impactor, forcing the coarser particles to follow their original trajectories into the receiving nozzle of the minor flow. Likewise, in FIG. 4, the coarser particulates entering via trajectories 352 and 354 with the total gas flow are unable to follow the streamlines of the major gas flow into hot side draw-off channel 367. As a result, the coarser particulates continue along their original trajectories 352 and 354 into dip tube 336 and quench chamber 314 along with the minor gas flow. As a result of the separation into the minor flow of most of the coarse and some of the fine particles, the major flow entering hot side draw-off channel 367 contains a reduced concentration of fine particulates and very little, if any, coarse particulates. Some of the residual fine particulates entrained in the major flow may impact the inclined surface of hot side draw-off channel 367 and form a layer of molten slag that runs back down into dip tube, thus affecting a further removal of particulates from the gas. Fine particles that remain in the major gas flow that passes through hot side draw-off channel 367 continue into transfer tube 360 and, from there, into second virtual impactor 362.

In an exemplary implementation, second virtual impactor 362, along with second quench chamber 364, together comprise slag separation vessel 370, the construction of which is similar to that of gasifier 302, with reaction chamber 308 and quench chamber 314. Second virtual impactor 362 is a refractory lined steel vessel in which the refractory lining defines an inlet channel 372 for conducting the total flow into the second impactor, a first outlet channel 374 for conducting the minor flow out of the second impactor and into second quench chamber 364, and a second outlet channel 376 for conducting the major flow out of second impactor and into connector 366 that defines inlet 356 to fire tube syngas cooler 306. Because first virtual impactor 358 and second virtual impactor 362 operate in series, the major flow that exits first virtual impactor 358 via hot side draw-off channel 367 becomes the total flow into second virtual impactor 362 via inlet channel 372. As with first virtual impactor 358, the valves and instrumentation that control the flow rates of the second minor flow into dip tube 378 of second quench chamber 364 and the second major flow into second outlet channel 376 are not shown. Likewise, for second virtual impactor 362, the control equipment for the minor flow is located downstream of quenched syngas exit 380 and the control equipment for the major flow is located downstream of exit 368 of fire tube syngas cooler 306. The refractory lining in second virtual impactor 362 also defines a body 382, which forms an extension of outlet channel 376 and which defines an enclosed space around the internal elements of second virtual impactor 362.

In some implementations, the internal elements of second virtual impactor 362 include an inlet insert 384 with a downward facing flow acceleration nozzle 386, a receiving nozzle 388, and a receiving nozzle flow guide 390. In one implementation, inlet insert 384 with flow acceleration nozzle 386 is fabricated from high temperature, slag resistant ceramic material, however, inlet insert 384 can be fabricated from any material that facilities resisting slag including, but not limited to, a refractory metal or a ceramic matrix composite. In one implementation, insert 384 is fabricated from a suitable metal with internal cooling channels (not shown). Receiving nozzle 388 and receiving nozzle flow guide 390 are formed into the surface of the refractory lining at a bottom portion of body 382. All of the components of second virtual impactor 362 taken together comprise a device which is functionally equivalent to virtual impactors 100 and 200 shown in FIGS. 2 and 3, respectively.

In an exemplary embodiment, the internal geometry of second virtual impactor 362 is such that the incoming total flow is accelerated through a nozzle with a much smaller diameter than the diameter of the flow acceleration nozzle of first virtual impactor, and imposes essentially a 180-degree turn on the gas that exits second impactor 362 as the major flow. The very high gas velocity through flow acceleration nozzle 386 plus the significant bending of the streamlines for the major gas flow ensure that the majority of the fine particulates that entered second impactor in the total gas remain with the minor flow and exit second virtual impactor 362 via first outlet channel 374. First outlet channel 374 directs the minor flow and the removed particulates into second quench chamber 364 where they are captured by pool of water 392, separating them from the minor gas flow, which then exits second quench chamber 364 as a second quenched syngas flow 380. As with first quench chamber 314, the level of pool of water 392 is controlled by regulating the inlet flow of fresh second quench water 394 to second quench ring 396 as well as the outlet blow down flow of second dirty quench water 398. In one implementation, a portion of the captured fine particulates exit second quench chamber 364 via second dirty quench water flow 398, while the remaining fine particulates exit via bottom connection 399 to a slag handling system (not shown). Thus, second virtual impactor 362 is configured to receive a flow of syngas containing residual fine particulates from first virtual impactor 358 and to cause a further separation of the residual fine particulates from the syngas, thereby presenting a virtually particulate free syngas to inlet 356 of the fire tube syngas cooler 306.

In an exemplary implementation, the ratio of the inner diameter of receiving nozzle 388 to the inner diameter of flow acceleration nozzle 386 ranges from 1.2 to 1.5. The ratio of the nozzle separation distance to the inner diameter of flow acceleration nozzle 386 ranges from 1.2 to 1.8. It should be noted that the ratio of the inner diameter of receiving nozzle 388 to the inner diameter of flow acceleration nozzle 386 and the nozzle separation distance to the inner diameter of flow acceleration nozzle 386 can be any value that facilitates producing particulate free syngas as described herein. A flow accelerating nozzle convergence angle ranges from 40° to 50°. In some implementations, as the diameter of acceleration nozzle 386 decreases, the cutoff diameter also decreases. Thus, the diameter of acceleration nozzle 386 may be decreased in order to drive more and more of the finer particles straight downwards into the first outlet along with the minor gas flow. This decrease in cutoff diameter occurs because the decrease in flow acceleration nozzle diameter increases the velocity of major gas flow through flow acceleration nozzle 386 which, in turn, imparts a higher downward momentum to the gas and all the entrained particles. This forces the gas flow streamlines to bend even more extremely as the major gas flow reverses direction out of the inlet to receiving nozzle 388, into body 382 and then into second outlet 376 of virtual impactor 304. Thus, virtual impactor 304 is configured to eliminate as many particles of all sizes from a major gas flow as possible by decreasing the diameter of flow acceleration nozzle 386 so that the increased velocity through flow acceleration nozzle 386 will impart a high initial downward momentum to as many of the particles of all sizes as possible and will force the streamlines of the major gas flow to bend as extremely as possible.

In some implementations, results from a gasification pilot unit have suggested that major to minor flow ratios of 5:1 to 20:1 are capable of reducing the particulate loading in syngas by roughly 80 to 90 percent, indicating that two virtual impactors in series may be capable of reducing syngas particulate loading by 96 to 99 percent. I should be appreciated that, although the above general design guidelines are expected to apply, actual virtual impactor dimensions may be optimized by specific design calculations, including, but not limited to, computer simulations using techniques such as computational fluid dynamics (CFD) simulations.

Figure 5:
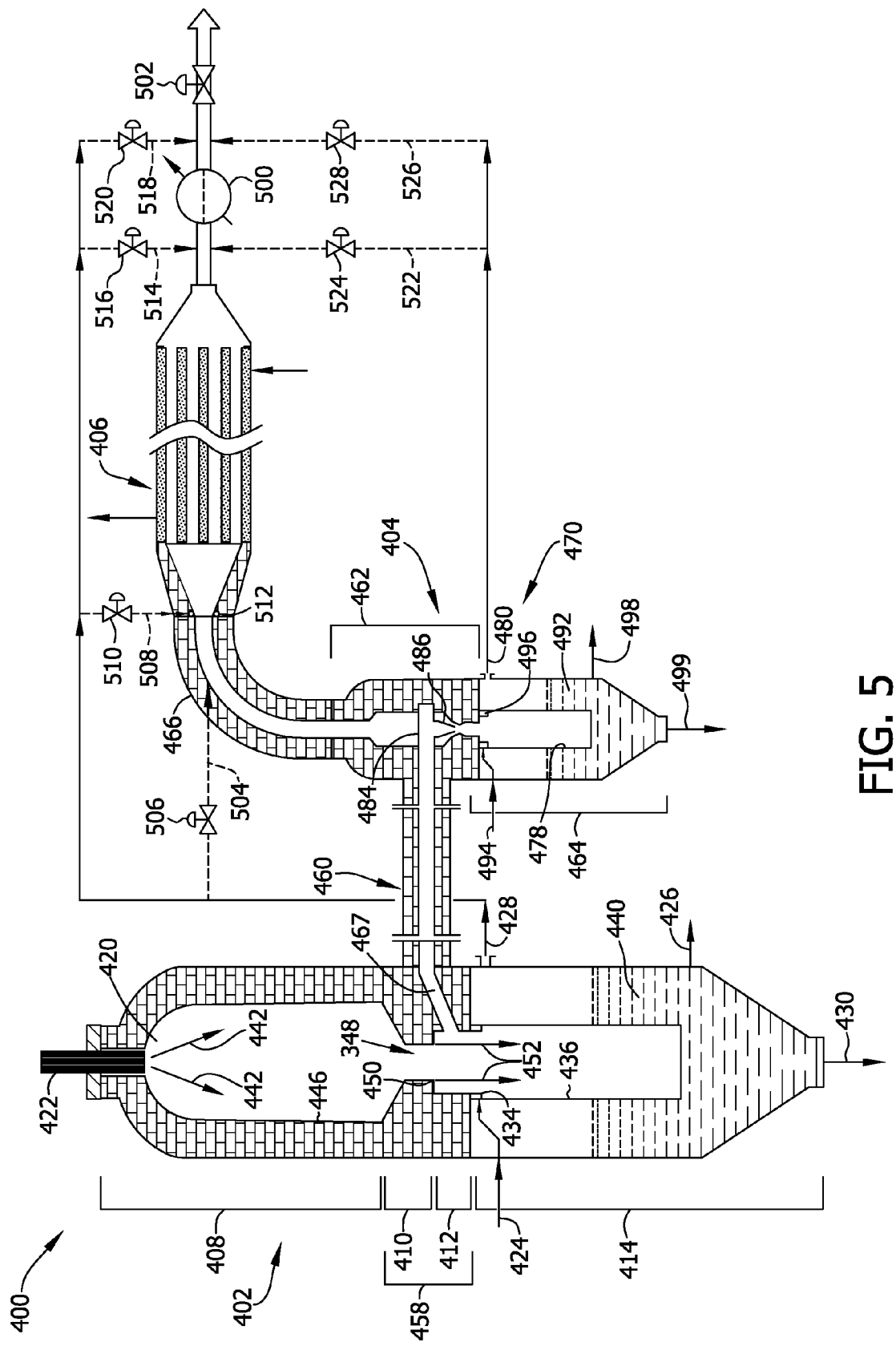
FIG. 5 is a schematic side view of an alternative exemplary gasification system that may be used in the IGCC power generation system shown in FIG. 1.

FIG. 5 is a schematic side view of an alternative exemplary gasification system 400 that may be used in the IGCC power generation system shown in FIG. 1. Gasification system 400 includes a high pressure, high temperature, entrained-flow gasifier 402, a two-stage particulate separator 404, and a fire tube syngas cooler 406. Gasifier 402 generates a hot, solids-containing raw syngas and two-stage solids separator 404 removes the solids from the syngas so that fire tube syngas cooler 406 can cool the gas without becoming plugged by the solids. Gasifier 402 includes a reactor 408, a bottom cone/exit throat 410, a plenum chamber 412 with a side draw-off channel 467, and a quench chamber 414. Quench chamber 414 includes a quench ring 434, a dip tube 436, a clean quench water inlet 424, a dirty quench water blow down outlet 426, a quenched syngas outlet 428, and a quenched, separated solids outlet 430. Two-stage solids separator 404 includes a first virtual impactor 458, a first quench chamber 414, a transfer tube 460, and a second virtual impactor 462 with an inlet insert 484, and a second quench chamber 464. Second quench chamber 464 includes a second quench ring 496, a second dip tube 478, a second clean quench water inlet 494, a second dirty quench water blow down outlet 498, a second quenched syngas exit 480, a second quenched, a separated solids outlet 499, and a connection 466 to fire tube syngas cooler 406. In one implementation, second virtual impactor 462 taken together with second quench chamber 464 comprise a slag separation vessel 470. All of the elements of FIG. 5 described above which are depicted identically in FIG. 5 to the corresponding elements in FIG. 4 have substantially the same features and substantially similar functions as the corresponding elements of FIG. 4. Thus, the hot particulate-laden syngas generated by gasifier 408 passes through first and second virtual impactors 458 and 462, respectively, before the particulate-laden syngas enters fire tube syngas cooler 406 as an essentially particle-free gas. First virtual impactor 458 removes a portion of the particulates entrained in the raw syngas leaving gasifier 408, directing the particulates into first quench chamber 414 where the particulates are quenched and captured by first pool of quench water 440. Second virtual impactor 462 removes essentially the remaining particulates, directing the remaining particulates into second quench chamber 464 where the remaining particulates are quenched and captured by second pool of quench water 498.

In an exemplary implementation, gasification system 400 includes a feed injector 422 at the top inlet of gasifier 408 and a connector 466 between second virtual impactor 462 and fire tube syngas cooler 406. In some implementations, the geometry of feed injector 422 is configured such that, as the feeds are mixed together and sprayed into gasifier reaction chamber 420, the expanding jet of reacting material forms a hollow cone as defined by arrows 442. Unlike FIG. 4, in which some of the reacting material follows a straight downward trajectory defined by arrows 344 and 354, feed injector 422 imparts an initial momentum to the injected material that is directed primarily away from the centerline of reaction chamber 420. Thus, essentially all of the molten ash and unreacted coal produced in gasifier reaction chamber 420 follows the trajectories defined by arrows 442. The molten ash and unreacted coal eventually intersects wall 446 of reaction chamber 420 and forms a layer of molten slag that runs down wall 446 and detaches from wall at edge 450 as a flow of droplets of molten slag 452 ranging from fractions of a millimeter to multiple centimeters in size. By imparting initial trajectories to the reacting material that are primarily away from a vertical centerline of reaction chamber 420, modified feed injector 442 forces more molten ash and unreacted fuel onto the wall where they are incorporated into the slag layer that forms relatively large droplets at edge 450. In doing so, feed injector 422 increases the quantity of coarser particulates 452 that exit first virtual impactor 458 along with the minor gas flow to dip tube 436 and decreases the quantity of finer particulates that have the ability to follow the bent streamlines and exit first virtual impactor 458 along with the major gas flow to hot side draw-off channel 467. Thus, modified feed injector 422 is configured to increase the effectiveness of first virtual impactor 458 in separating particulate solids from the flow of syngas from gasifier 408 to second virtual impactor 462. Reducing the quantity of fine particulates entering second virtual impactor 462 enables flow acceleration nozzle 486 of inlet insert 484 to be designed with a much smaller diameter without increasing the risk of plugging the smaller nozzle by overwhelming it with too many particles. The smaller diameter increases the velocity of the gas and entrained fine particulates through nozzle 486 which, in turn, forces a larger fraction of the remaining fine particulates downwards with the minor flow into second dip tube 478 and second quench chamber 464. Feed injector 422 is configured to reduce the diameter of the very finest particulates that are able to follow the streamlines of the gas and exit second virtual impactor 462. In some implementation, modified feed injector 422 enables first virtual impactor 458 to be more effective by producing a coarser size distribution of particles leaving reaction chamber 420, but also enable second virtual impactor 462 to be more effective by reducing the particulate loading on second virtual impactor 462 by enabling second virtual impactor 462 to be designed using the smaller nozzle dimensions.

In an exemplary implementation, connector 466 between second virtual impactor 462 and fire tube syngas cooler 406 is configured as a long radius 90-degree bend that directs the essentially particulate free syngas into the horizontally oriented fire tube syngas cooler 406. The horizontal orientation of syngas cooler 406 reduces the height and weight of the required support structure and the length of the piping that connects to downstream equipment. Such a configuration, results in a more compact gasification plant layout, which reduces capital cost.

In one implementation, downstream of fire tube syngas cooler 406 is a second syngas cooler 500 and a control valve 502 that can be used to control the backpressure of gasification system 400. First quenched syngas exit flow 428 is shown as a syngas header (solid line) feeding four alternative downstream injection lines (dashed lines), each having a respective flow control valve. An injection line 504 and a flow control valve 506 of injection line 504 enables quenched syngas to be injected into curved connector 466 between second virtual impactor 462 and the horizontally oriented fire tube syngas cooler 406. An injection line 508 and a flow control valve 510 of injection line 508 enable quenched syngas to be injected into the inlet of fire tube syngas cooler 406 via distribution ring 512. An injection line 514 and a flow control valve 516 of line 514 enable quenched syngas to be injected into the syngas conduit connecting the outlet of fire tube syngas cooler 406 with the inlet of second fire tube syngas cooler 500. An injection line 518 and a flow control valve 520 of line 518 enable quenched syngas to be injected into the syngas conduit downstream of second fire tube syngas cooler 500.

In some implementations, the gas temperature of first quenched syngas exit flow 428 may typically be between 350° F. and 500° F., depending upon the operating pressure and temperature of gasifier reaction chamber 420 and the flow rate and temperature of the clean quench water flow 424. In contrast, the syngas temperature at the inlet of fire tube syngas cooler 406 may typically be between 2350° F. and 2600° F., depending upon the operating temperature of gasifier reaction chamber 420. By injecting the cooler quenched syngas into the fired syngas cooler inlet via either line 504 or 508, the inlet temperature of the gas entering syngas cooler 406 may be reduced. Reducing the inlet temperature may be advantageous because it may reduce the temperature requirements of the syngas cooler materials of construction. A further advantage may be that the reduced temperature may cool any very fine particulates remaining in the syngas after second virtual impactor 462 to the point where the particulates are not sticky, thereby reducing the likelihood that any particulates will adhere to the surfaces of syngas cooler 406. By injecting quenched syngas via line 514, the temperature of the syngas and the level of stickiness of particles in the syngas entering second syngas cooler 500 may be controlled to obtain the same advantages that were noted for syngas cooler 406. Injecting quenched syngas via line 518 allows all quenched syngas from the first quench chamber to bypass the syngas coolers before being recombined with the cooled syngas prior to downstream processing. As with first quenched syngas exit flow 428, second quenched syngas exit flow 480 is shown as a syngas header (solid line) feeding two alternative downstream injection lines (dashed lines), each having a respective flow control valve. An injection line 522 and a flow control valve 524 of line 522 enable the second quenched syngas to be injected into the syngas conduit connecting the outlet of fire tube syngas cooler 406 with the inlet of second fire tube syngas cooler 500. An injection line 526 and a flow control valve 528 of line 526 enables the second quenched syngas to be injected into the syngas conduit downstream of the second fire tube syngas cooler 500. Second quenched syngas injection lines 522 and 526 may perform functions substantially similar to first quenched syngas injection lines 514 and 518.

In some implementations, first quenched syngas injection lines 504, 508, 514, and 518 may be operated one at a time or in various combinations of two, three, or all four of the lines, depending upon the design goals of the system. When two or more of first quenched syngas injection lines 504, 508, 514, and 518 are operated simultaneously, the fraction of quenched syngas injected through each of the lines may vary from 0% to 100%, with the total equaling 100%. In some implementations, second quenched syngas injection lines 522 and 526 may be operated singly or together. When operating second quenched syngas 522 and 526 lines together, the fraction of quenched syngas injected through either of lines 522 and 526 may vary from 0% to 100%, with the total equaling 100%. In some implementations, the amount of syngas directed through first quenched syngas exit flow 428 during operation of gasification system 400 may vary from 1 to 75%, from 2 to 50%, from 3 to 25%, from 4 to 15% or from 5 to 10% of the syngas flow rate exiting the reaction chamber 420, depending upon the design goals of the system. In one implementation, the amount of syngas directed through second quenched syngas exit flow 480 during operation of gasification system 400 may vary from 1 to 75%, from 2 to 50%, from 3 to 25%, from 4 to 15% or from 5 to 10% of the syngas flowing in transfer tube 460, depending upon the design goals of the system. In some implementations, either first quenched syngas exit flow 428, second quenched syngas exit flow 480 or both first quenched syngas exit flow 428 and second quenched syngas exit flow 480 may be recombined at one or more alternate points along the syngas line downstream of backpressure control valve 502, as required by the design goals of the system. In one implementation, gasification system 300, shown in FIG. 4, is equipped with similar quenched syngas injections lines that operate in the same manner that shown in FIG. 5.

Figure 6:
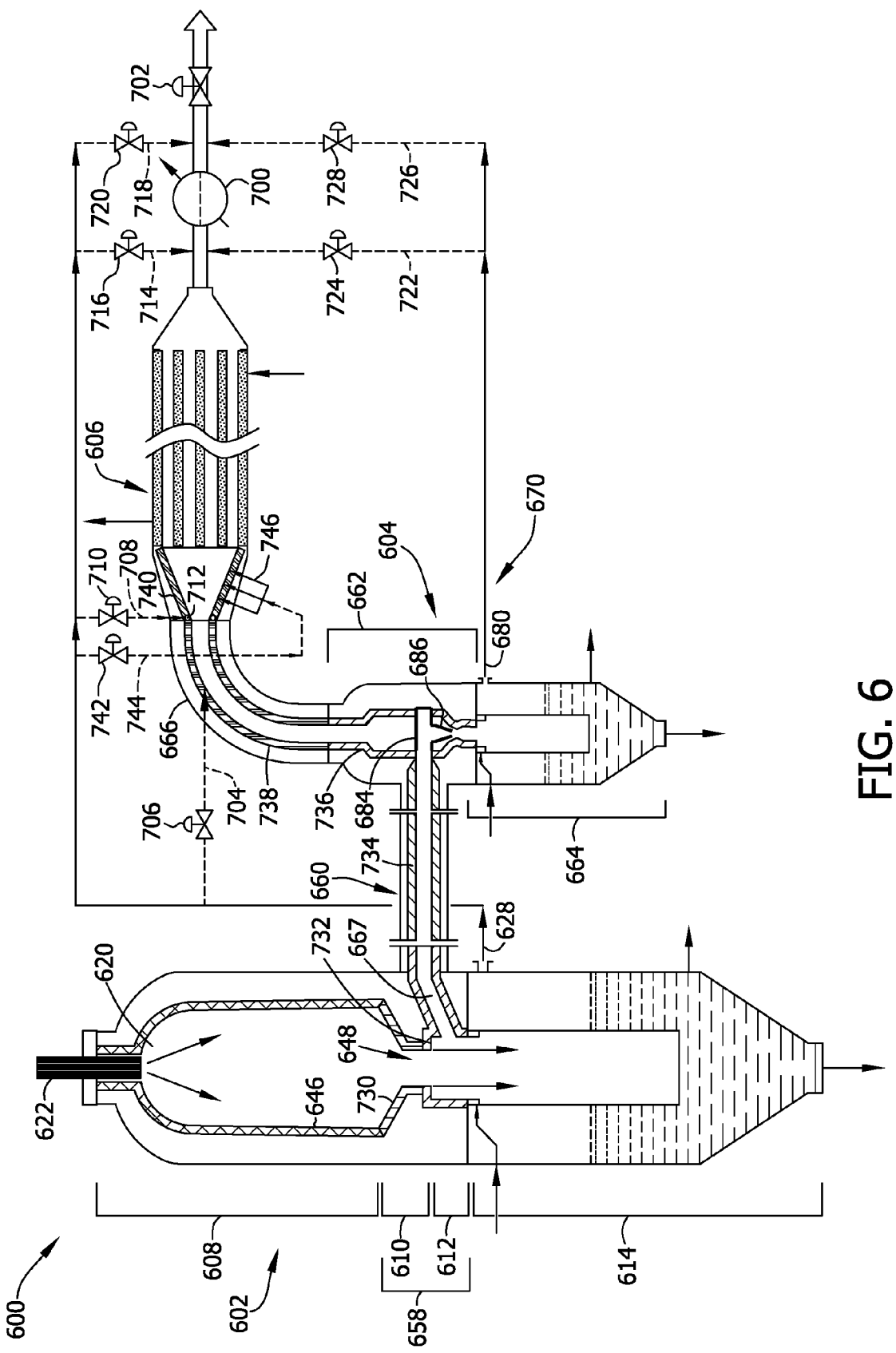
FIG. 6 is a schematic side view of an alternative exemplary gasification system that may be used in the IGCC power generation system shown in FIG. 1.

FIG. 6, which shows another alternative implementation to the one shown in FIG. 4, depicts an exemplary gasification system 600 comprising a high pressure, high temperature, entrained-flow gasifier 602, a two-stage particulate separator 604 and a fire tube syngas cooler 606. Gasifier 602 generates a hot, solids-containing raw syngas and two-stage solids separator 604 removes the solids from the syngas so that fire tube syngas cooler 606 can cool the gas without becoming plugged by the solids. As in FIG. 5, gasifier 602 comprises a reactor 608 with modified feed injector 622, a bottom cone/exit throat 610, a plenum chamber 612 with a side draw-off channel 667 and a quench chamber 614 with all of the same features and functions shown for quench chambers 314 and 414 of FIGS. 4 and 5, respectively. Also as shown in the previous figures, two-stage solids separator 604 comprises a first virtual impactor 658, a first quench chamber 614, a transfer tube 660, a second virtual impactor 662 with an inlet insert 684, a second quench chamber 664 with all of the features and functions shown for second quench chambers 364 and 464 of FIGS. 4 and 5, respectively, and a connection 666 to fire tube syngas cooler 606, wherein second virtual impactor 662 taken together with second quench chamber 664 comprise slag separation vessel 670. Gasification system 600 of FIG. 6, including gasifier 602, two-stage particulate separator 604 with its first virtual impactor 658, its second virtual impactor 662 and its curved connector 666, and fire tube syngas cooler 606 all have essentially the same features and functions as the equivalent elements of FIG. 5. The principal difference between the components of FIG. 6 and those of FIG. 5 is that, in FIG. 6, the surface of the hot gas path, that is, the surface in direct contact with the hot syngas flowing through the system, is constructed not of passive materials, such as refractory ceramic materials, but of an actively cooled lining, such as a welded membrane wall consisting of parallel metal tubes that have been shaped and welded together to form the enclosed spaces and passages required by the system. Flowing within the tubes, which may be made of steel, high alloy steel, copper, copper alloys or any metal suitable for the service, is a circulating cooling fluid, such as boiler feed water, steam or a heat transfer oil, which keeps the tubes cool enough to maintain their mechanical integrity and the integrity of the shapes into which they have been formed. The details of the active cooling circuits comprising the membrane wall or walls, e.g. the inlet and outlet connections and the direction of cooling fluid circulation, are not shown in FIG. 6. However, the construction and proper operation of actively cooled membrane walls is well known to those skilled in the art. Thus, in FIG. 6, it can be seen that reaction chamber 620 is defined by membrane wall 646, gasifier exit passage 648 through bottom cone/exit throat 610 is defined by membrane wall 730, plenum chamber 612 and hot syngas side draw-off channel 667 are defined by membrane wall 732, transfer tube 660 is defined by membrane wall 734, second virtual impactor 662 is defined by membrane wall 736 and inlet insert 684, and connector 666 is defined by membrane walls 738 and 740. Note that, in other alternatives, the actively cooled membrane walls may be segmented differently than what is shown in FIG. 6. Note also that inlet insert 684 of second virtual impactor 662 may require special construction in order to accurately control the dimensions of flow acceleration nozzle 686 and the required internal cooling passages (not shown). For example, inlet insert 684 may be made by casting or machining a single block of a suitable metal or by fabricating the piece directly from suitable raw materials using an advanced additive metal fabrication process such as direct metal laser sintering. The construction and operation of the first quench chamber 614 and second quench chamber 664 remain the same in FIG. 6 as they do in FIG. 5, as is also the case with downstream syngas cooler 700 and backpressure control valve 702. Thus, the refractory-lined gasification system 400 of FIG. 5 can be constructed using the alternative actively cooled wall construction of gasification system 600 shown in FIG. 6 while maintaining the same features and functions of FIG. 5.

FIG. 6 gasification system 600 provides several process options for handling a first quenched syngas exit flow 628 and a second quenched syngas exit flow 680 that are similar to the options available in FIG. 5. As in FIG. 5, first quench syngas exit flow 628 and second quenched syngas exit flow 680 are both shown as major headers (solid lines), with each having two or more reinjection options (dashed lines) controlled by individual flow control valves. Thus, quenched syngas 628 from first quench chamber 614 can be reinjected into curved connector 666 via line 704 and valve 706, into the inlet of syngas cooler 606 via line 708, valve 710 and distribution ring 712, into the inlet of syngas cooler 700 via line 714 and valve 716 or downstream of syngas cooler 700 via line 718 and valve 720. As an alternative to line 708, valve 710 and distribution ring 712, quenched syngas may be reinjected into the inlet of syngas cooler 606 via line 742 and valve 744 and multiple injection points 746. Use of multiple injection points distributed around the entire surface of connector 666 upstream of syngas cooler 606 allows a film of cooled and quenched gas to be generated along the surface of the membrane wall which may help to contain any residual very fine particulates within the interior of the flow conduit so that the particulates can be cooled below the point where they are sticky before they enter syngas cooler 606. Such a configuration enables a longer-term fouling of syngas cooler 606 by deposition of very fine particulates that may have escaped past second virtual impactor 662. Quenched syngas 680 from second quench chamber 664 can be reinjected upstream of syngas cooler 700 via line 722 and valve 724 or downstream of syngas cooler 700 via line 726 and valve 728. As with FIG. 5, the quenched syngas from the first and second quench chambers in FIG. 6 may also be reinjected into the syngas even further downstream of backpressure control valve 702 via injection points not shown in FIG. 6.

Figure 7:
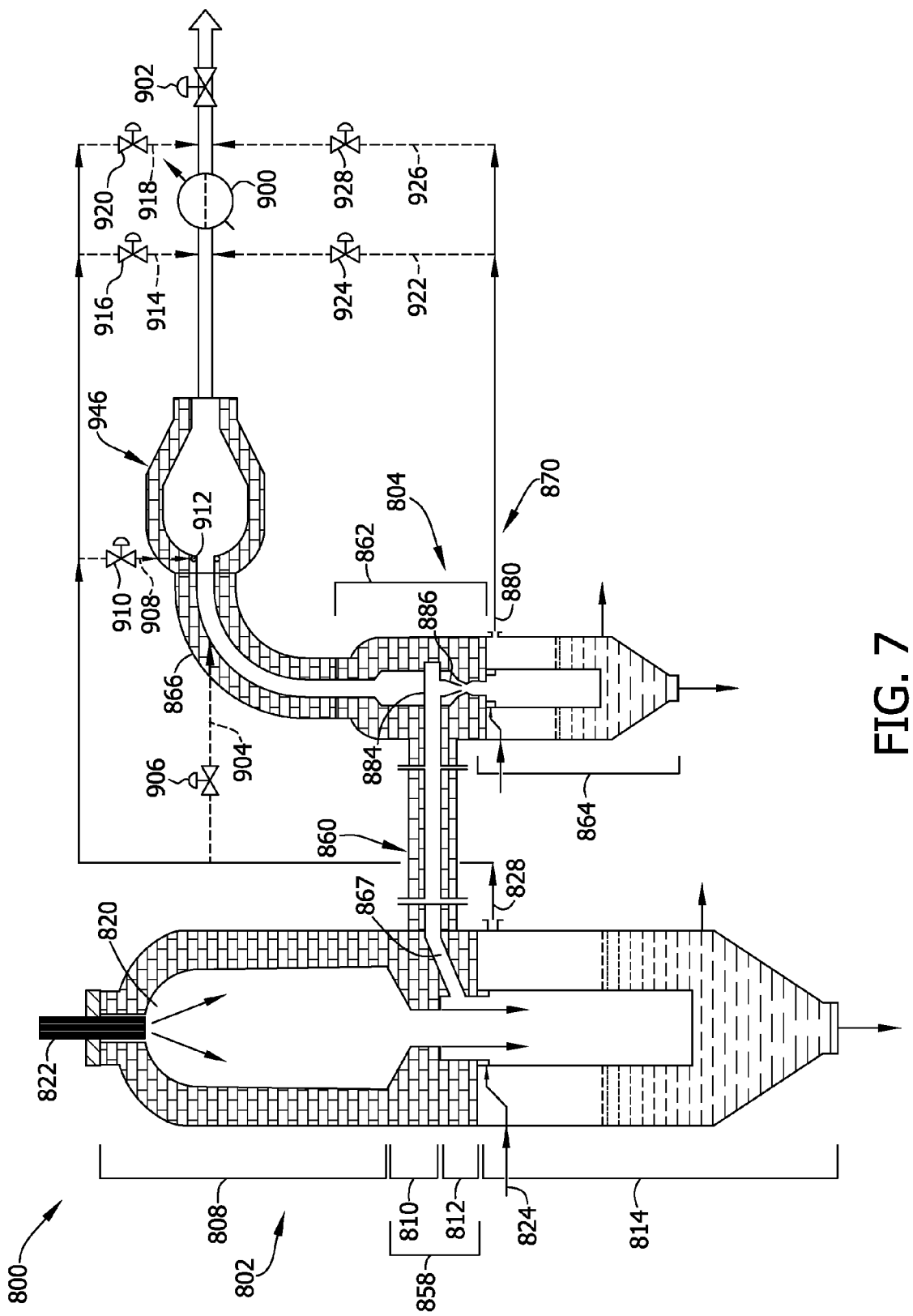
FIG. 7 is a schematic side view of an alternative exemplary gasification system that may be used in the IGCC power generation system shown in FIG. 1.

FIG. 7 is a schematic side view of an alternative exemplary gasification system 800 that may be used in the IGCC power generation system 1 shown in FIG. 1. In an exemplary implementation, gasification system 800 includes a partial quench chamber 946. All of the elements in FIG. 7, from modified feed injector 822 and gasifier 802 through two-stage particulate separator 804 to curved connector 866 are substantially similar in form, feature, and function to corresponding elements in FIG. 5. For example, as in FIG. 5, two-stage particulate separator 804 shown in FIG. 7 includes a first virtual impactor 858, a transfer tube 860, and a second virtual impactor 862 with inlet insert 884 and flow acceleration nozzle 886. In the implementation shown in FIG. 7, gasifier 802 generates a hot, solids-containing raw syngas and two-stage solids separator 804 that removes the solids from the syngas. In the exemplary implementation, the syngas is directed to partial quench chamber 946 where it is mixed with a flow of quenched syngas 828 from first quench chamber 814 that is injected into partial quench chamber 946 via line 904 and valve 906 or line 908, valve 910, and distribution ring 912.

In some implementations, gasifier reaction chamber 820 operates between 2100° and 2700° F., however reaction chamber 820 can operate at any temperature that facilitates the production of particulate free syngas as described herein. In one implementation, depending upon the reaction chamber operating temperature and pressure and on the temperature of clean quench water 824, the temperature of quenched syngas 828 from first quench chamber 814 varies between 375° and 500° F. Thus, gasifier reaction chamber 820 operating temperature sets the upper bound for the temperature of the syngas in partial quench chamber 946 and the quenched syngas exit temperature sets the lower bound for the temperature of the syngas in partial quench chamber 946. By varying the ratio of hot syngas that enters partial quench chamber 946 via second virtual impactor 862 to quenched syngas that enters partial quench chamber 946 via line 904 or line 908, the temperature of the hot/quenched syngas mixture leaving partial quench chamber 946 may be varied from 2100° to 2700° F. down to 375° to 500° F. It should be noted that at least two advantages that may be obtained by cooling the hot particulate free syngas from second virtual impactor 862 by mixing it with quenched syngas 828 in partial quench chamber 946 as opposed to using a fire tube syngas cooler. First, a partially cooled syngas can be presented to downstream syngas cooler 900 without the capital expense required for installing an upstream fire tube syngas cooler, such as syngas cooler 406 shown in FIG. 5. In this way, substantially all of the indirect heat exchange duty for the entire hot syngas stream can be moved to downstream syngas cooler 900, which may be fabricated from less expensive materials, as the inlet temperature can been appropriately reduced by the partial quenching operation. Second, downstream syngas cooler 900 may be eliminated, and the partially quenched syngas from partial quench chamber 946 may be directed to a downstream process that requires hot or warm syngas. For example, a number of hot and warm gas desulfurization processes have been developed that remove sulfur species such as hydrogen sulfide and carbonyl sulfide from syngas at temperatures in the range of 600° to 1400° F. In some implementations, gasification system 800 of can be used to provide syngas at the appropriate temperature to such desulfurization processes. Alternatively, the partially quenched syngas may be directed to a water gas shift reactor or reactors.

As with gasification system 400 shown in FIG. 5, quenched syngas 828 from first quench chamber 814 and second quenched syngas 880 from second quench chamber 864 may be reinjected into the main syngas line at one or more points, depending on the design goals of the system. For example, first quenched syngas 828 may be reinjected into partial quench chamber 946 via lines 904 and 908. First quenched syngas 828 may also be reinjected into the main syngas line upstream of syngas cooler 900 via line 914 and valve 916 or upstream of backpressure control valve 902 via line 918 and valve 920. Likewise, second quenched syngas 880 may be reinjected upstream of syngas cooler 900 via line 922 and valve 924 or upstream of backpressure control valve 902 via line 926 and valve 928. And, as with FIG. 5, the first and second quenched syngas may be reinjected into the main syngas stream downstream of backpressure control valve 902 via reinjection points not shown in FIG. 7.

It will be apparent to those skilled in the art that, although partial quench chamber 946 is depicted as a large refractory-lined steel vessel, it may also be designed as a wide spot in the main syngas line or simply as a quenched syngas reinjection point in a refractory-lined segment of the main syngas line downstream of second virtual impactor 862. Furthermore, it will also be apparent that, just as gasification system 400 of FIG. 5 may be constructed using the alternative implementation employing actively cooled walls shown in FIG. 6, gasification system 800 of FIG. 7 may also be constructed using an alternative implementation employing actively cooled walls for gasifier reactor 808, bottom cone/exit throat 810, plenum chamber 812, hot syngas side draw-off channel 867, transfer tube 860, second virtual impactor 862 with inlet insert 884, curved connector 866 and partial quench chamber 946.

The above-described gasification systems are cost-effective and highly reliable. The above-described gasification systems provide an opportunity to use a fire tube syngas cooler wherein previous gasification systems were unable to use a fire tube syngas cooler because of slag deposition and accumulation within the fire tubes. The use of a two-stage particulate separator employing virtual impactors in series plus the alternative additional use of a modified feed injector provides the particulate removal necessary to use a cooling system such as a fire tube syngas cooler with a reduced likelihood of plugging and/or slag build-up forming within the fire tubes of the cooler. The gasification system also allows the fire tube syngas cooler to be horizontally oriented to provide a cost-effective way of constructing the gasification system.

Exemplary implementations of gasification systems are described above in detail. The gasification system components illustrated are not limited to the specific implementations described herein, but rather, components of each system may be utilized independently and separately from other components described herein. For example, the gasification system components described above may also be used in combination with different IGCC system components.

While the invention has been described in terms of various specific embodiments, those skilled in the art will recognize that the invention can be practiced with modification within the spirit and scope of the claims.

What is claimed is:

1. A two-stage particulate separator for use in a gasifier system, said two-stage particulate separator comprising:
   a first virtual impactor including a first flow acceleration nozzle and a side draw-off connector, said first flow acceleration nozzle defining a first throat diameter, said first virtual impactor configured to separate a particulate laden flow of a reaction product into a first flow and a particulate laden second flow, the first flow containing residual particulates;
   a first quench chamber coupled downstream from said first virtual impactor configured to receive at least the particulate laden second flow;
   a transfer line coupled downstream of said side draw-off connector and configured to receive the first flow;
   a second virtual impactor coupled downstream of said transfer line, said second virtual impactor including a second flow acceleration nozzle defining a second throat diameter that is less than said first throat diameter, said second virtual impactor configured to separate the first flow into a third flow and a fourth flow, the fourth flow containing a majority of the residual particulates; and
   a second quench chamber coupled downstream from said second virtual impactor, said second quench chamber configured to receive at least the fourth flow from the second virtual impactor.

2. A two-stage particulate separator in accordance with claim 1 wherein said two-stage particulate separator is coupled between a gasifier reaction chamber upstream of said two-stage particulate separator and a syngas cooler downstream of said two-stage particulate separator.

3. A two-stage particulate separator in accordance with claim 1 wherein said two-stage particulate separator is at least one of a portion of a refractory lining of a gasifier and slag separation vessel and a portion of an actively cooled lining of a gasifier and slag separation vessel.

4. A two-stage particulate separator in accordance with claim 2 wherein said syngas cooler is at least one of a fire tube syngas cooler and a partial quench chamber.

5. A two-stage particulate separator in accordance with claim 1 further comprising a reactor comprising a reaction chamber defined therein, said reactor coupled upstream of said first virtual impactor, said two-stage particulate separator further comprising a modified feed injector configured to inject feeds into said reactor with initial trajectories substantially away from the centerline of said reaction chamber.

6. A gasifier system for use with a turbine, said gasifier system comprising:
   a reactor comprising a reaction chamber defined therein;
   a two-stage particulate separator coupled to said reactor, said two-stage particulate separator comprising:
      a first virtual impactor including a first flow acceleration nozzle and a side draw-off connector, said first flow acceleration nozzle defining a first throat diameter, said first virtual impactor configured to separate a particulate laden flow of a reaction product into a first flow and a particulate laden second flow, the first flow containing residual particulates;
      a transfer line coupled downstream of said side draw-off connector and configured to receive the first flow; and
      a second virtual impactor coupled downstream of said transfer line, said second virtual impactor including a second flow acceleration nozzle defining a second throat diameter that is less than said first throat diameter, said second virtual impactor configured to separate the first flow into a third flow and a fourth flow, the fourth flow containing a majority of the residual particulates; and
   a syngas cooler coupled downstream from said two-stage particulate separator.

7. A gasifier system in accordance with claim 6 further comprising a modified feed injector configured to inject feeds into said reactor with initial trajectories substantially away from the centerline of the gasifier reaction chamber.

8. A gasifier system in accordance with claim 6 wherein said two-stage particulate separator further comprises a first quench chamber configured to receive at least the second flow from the first virtual impactor.

9. A gasifier system in accordance with claim 6 wherein said two-stage particulate separator comprises a second quench chamber configured to receive at least the fourth flow from the second virtual impactor.

10. A gasifier system in accordance with claim 6 wherein said syngas cooler is at least one of a fire tube syngas cooler and a partial quench chamber.

11. A gasifier system in accordance with claim 6 wherein at said syngas cooler is at least partially oriented in at least one of a horizontal position and a vertical position.

12. A gasifier system in accordance with claim 9 wherein at least one of said first quench chamber and said second quench chamber comprises an exit for channeling the the corresponding one of the second flow and the fourth flow downstream into said syngas cooler.

13. A gasifier system in accordance with claim 8 wherein said side draw-off extends at least partially upwardly from said reactor, such that particulate contacts said side draw-off and is gravitationally drawn toward said first quench chamber.

14. A gasifier system in accordance with claim 6 wherein said two-stage particulate separator is at least one of a portion of a refractory lining of a gasifier and slag separation vessel and a portion of an actively cooled lining of a gasifier and slag separation vessel.

15. A gasifier system in accordance with claim 6 wherein the inlet to the syngas cooler further comprises an inner membrane comprising a plurality of slots configured to channel a flow of cooling gas across a surface of said membrane such that a film of cooling gas covers at least a portion of the membrane surface.

* * * * *